(12) United States Patent
Horen

(10) Patent No.: US 8,286,217 B2
(45) Date of Patent: Oct. 9, 2012

(54) METHOD AND SYSTEM FOR FAST CHANNEL CHANGE

(75) Inventor: Robert Sydney Horen, Pleasanton, CA (US)

(73) Assignee: Espial Group Inc., Ottawa (CA)

( * ) Notice: Subject to any disclaimer, the term of this patent is extended or adjusted under 35 U.S.C. 154(b) by 434 days.

(21) Appl. No.: 12/563,098

(22) Filed: Sep. 18, 2009

(65) Prior Publication Data

US 2011/0072484 A1 Mar. 24, 2011

(51) Int. Cl.
*H04N 7/173* (2011.01)
(52) U.S. Cl. ............. 725/118; 725/86; 725/95; 725/120
(58) Field of Classification Search .................... 725/86, 725/95, 118, 120
See application file for complete search history.

(56) References Cited

U.S. PATENT DOCUMENTS

2007/0250890 A1 * 10/2007 Joshi et al. .................... 725/120
* cited by examiner

*Primary Examiner* — Kieu Oanh T Bui
(74) *Attorney, Agent, or Firm* — Michael Haynes PLC; Michael N. Haynes

(57) ABSTRACT

A method and system for fast channel change (FCC) between multicast digital video feeds wherein each digital video feed is converted to a set of slotted multicasts, each having the same content but delayed in time relative to each other, metadata associated with the digital video feed and the slotted multicasts is published using an on-the-wire format to downstream client devices (e.g. set-top boxes), when a user selects the digital video feed (i.e. a new channel) the client device uses the metadata to select a slotted multicast that minimizes the total time to reach the next random access point (RAP) while allowing a maximum leave-join delay. Both a FCC server that generates the slotted multicasts and a FCC middleware on the client devices are connected to a common time reference, and the method and system provide for adjusting to clock drift on the FCC server relative to the common time reference.

18 Claims, 6 Drawing Sheets

On the wire format:

| |
|---|
| Multicast address – 64 bits |
| Multicast port range – 32 bits (16 bits lower + 16 bits upper) |
| Retransmit spacing interval (SI) - 32 bits |
| Delay value (T2) – 32 bits |
| NTP start point (N) – 64 bits |
| Clock Drift (CD) – 32 bits |

Total data per FCC enabled channel per time interval is 24 bytes (192 bits). Data is transmitted once a second.

Fig. 4

METHOD AND SYSTEM FOR FAST CHANNEL CHANGE

FIELD OF INVENTION

The present invention relates to the field of reducing delays when switching between digital video feeds (a.k.a. channels). In particular, to a method and system for fast channel change between multicast digital video feeds.

BACKGROUND

Digital video signals such as, for example, digital television channels are typical compressed (a.k.a. encoded) (e.g. in accordance with International Telecommunications Union recommendation (ITU-T) H.264 Advanced Video Coding for Generic Audiovisual Services) before transmission in order to reduce the transmission bandwidth requirement. Both intra-frame and inter-frame compression techniques can be used. An intra-coded frame is a fully-specified frame (a.k.a. I-frame) that does not need to refer to any other frame to be decoded. An inter-coded frame can be in the form of a P-frame that only contains information relating to changes from a preceding frame, or in the form of a B-frame that contains information relating to differences between the current frame and both the preceding and the following frames. P-frames can only be decoded in the context of a preceding frame while B-frames can only be decoded in the context of a preceding frame and a following frame. I-frames are the least compressed while P-frames and B-frames are more compressed.

A typical coded (i.e. compressed) video signal (i.e. stream) comprises I-frames spaced apart at intervals in time with a series of P- or B-frames in between I-frames. The use of both I-frames and P- or B-frames permits for greater compression than the use of I-frames alone.

Generally the greater the time interval between I-frames the greater the compression of video signal, but also the greater the delay before decoding of the video stream can start when switching to the video stream. When switching to a compressed video streams, decoding of the stream cannot start until an I-frame is received. A point in the video stream where decoding can begin is also referred to as a random access point (RAP). The time lapse between when a switch is made to a video stream (e.g. Internet Protocol television (IPTV) channel) and when decoding can begin is referred to as a join delay.

Various solutions have been proposed in order to minimize the join delay. These include the solution described in United States Patent Publication No. 2007/0250890 A1 the entirety of which is incorporated herein by reference. The present invention improves upon the solution described in the incorporated reference which, for example, does not provide a mechanism for abstracting a heterogeneous set of Video-on-Demand (VOD) servers for use by a single middleware client.

SUMMARY OF INVENTION

A method and system for fast channel change (FCC) between multicast digital video feeds wherein each digital video feed is converted to a set of slotted multicasts, each having the same content but delayed in time relative to each other, metadata associated with the digital video feed and the slotted multicasts is published using an on-the-wire format to downstream client devices (e.g. set-top boxes), when a user selects the digital video feed (i.e. a new channel) the client device uses the metadata to select a slotted multicast that minimizes the total time to reach the next random access point (RAP) while allowing a maximum leave-join delay. Both a FCC server that generates the slotted multicasts and a FCC middleware on the client devices are connected to a common time reference, and the method and system provide for adjusting to clock drift on the FCC server relative to the common time reference.

In accordance with one aspect of the present invention, there is provided a system for fast channel change (FCC) comprising: a FCC server for: generating, responsive to a received and stored multicast channel, a plurality of corresponding slotted multicasts each having the same content as the multicast channel and delayed in time relative to the multicast channel and to each of the other slotted multicasts; generating a FCC metadata record for each of the slotted multicasts; and inserting the FCC metadata records into a multicast metadata channel output by the FCC server; and one or more FCC middleware components, each for determining, responsive to a channel change request from a viewer, the slotted multicast that minimizes the total time to reach a next random access point while allowing a maximum leave-join delay based on metadata records received in the multicast metadata channel.

In accordance with another aspect of the present invention, there is provided a method for fast channel change (FCC) comprising the steps of: generating, responsive to a received and stored multicast channel, a plurality of corresponding slotted multicasts each having the same content as the multicast channel and delayed in time relative to the multicast channel and to each of the other slotted multicasts; generating a FCC metadata record for each of the slotted multicasts; and inserting the FCC metadata records into a multicast metadata channel output by the FCC server; and determining, responsive to a channel change request from a viewer, the slotted multicast that minimizes the total time to reach a next random access point while allowing a maximum leave-join delay based on metadata records received in the multicast metadata channel.

Other aspects and features of the present invention will become apparent to those ordinarily skilled in the art or science to which it pertains upon review of the following description of specific embodiments of the invention in conjunction with the accompanying figures.

BRIEF DESCRIPTION OF DRAWINGS

The present invention will be described in conjunction with drawings in which:

FIG. 4 is a representation of an exemplary embodiment of an on-the-wire format for each FCC metadata record in a multicast metadata channel.

DETAILED DESCRIPTION

Figure 1:
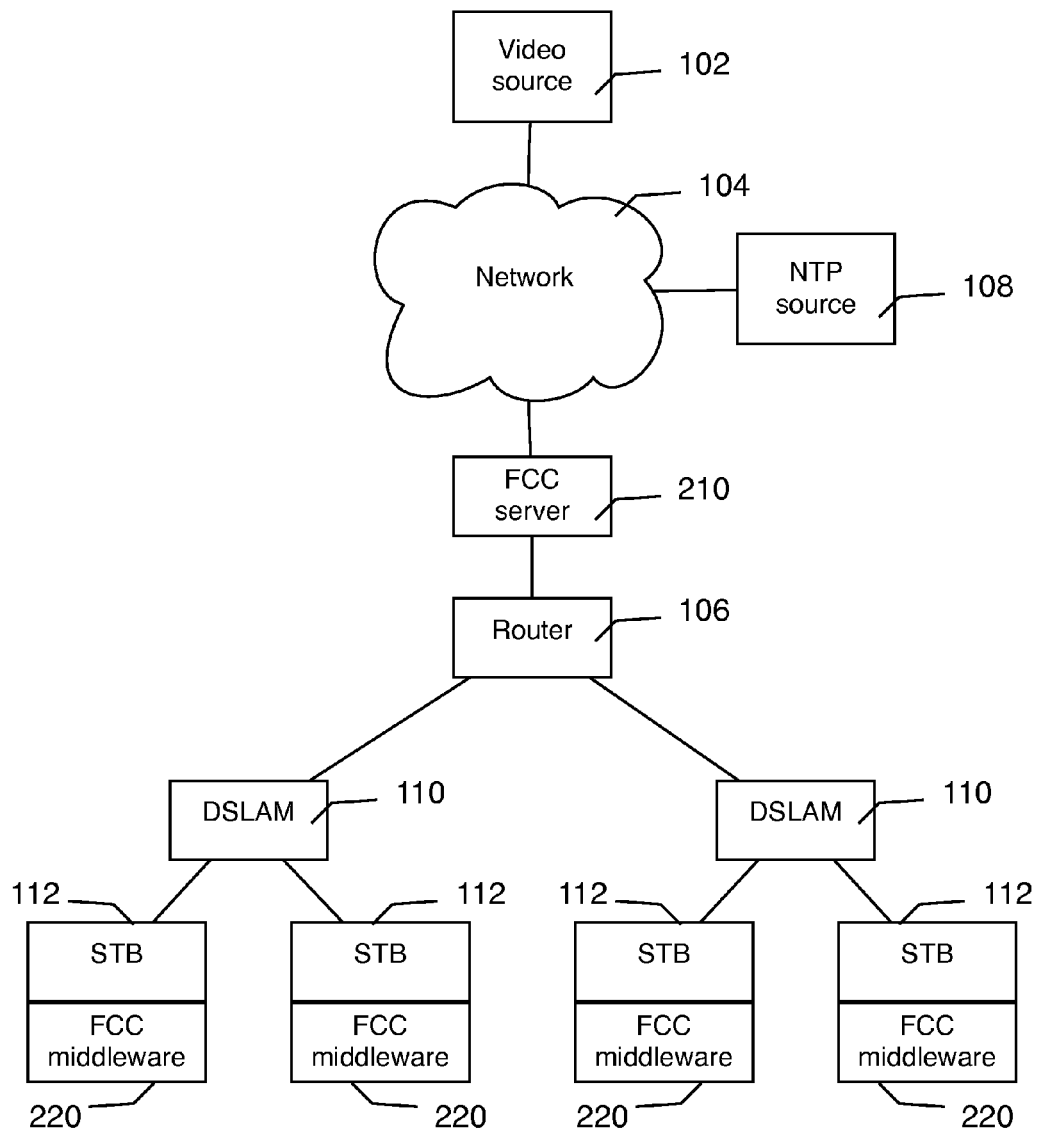
FIG. 1 is a schematic representation of an exemplary system for fast channel change illustrated in a typical operating environment.

FIG. 1 is a schematic representation of an exemplary system 200 for fast channel change (FCC), comprising a FCC server 210 and a plurality of FCC middleware components 220, illustrated in a typical operating environment. The operating environment includes a video source 102, a network 104, a NTP source 108, a router 106, one or more digital subscriber line access multiplexers (DSLAM) 110 and a plurality of set-top boxes (STB) 112. The video source 102 can be a cable head-end or other similar source of a plurality of compressed, multicast video streams (i.e. channels). The video streams are transmitted over a network 104 to one or more systems 200. The network 104 can be, for example, any well-known broadband transmission infrastructure such as those typically deployed by telecommunications operating companies (a.k.a. telco's). The FCC server 210 can receive one or more of the multicast video streams (i.e. channels) from the video source 102. Video streams output by the FCC server 210 are directed, via the router 106, to one or more DSLAM 110 over a broadband medium. Further details of the operation of the FCC server 210 are provided below. One or more of the plurality of STB 112 are connected (i.e. in data communications with) to one of the DSLAM 110. Each STB 112 can join one or more of the channels provided to the connected DSLAM 110 by signaling a multicast join request to the DSLAM 110. FFC middleware component 220 executing on each of the STB 112 provide for fast switching from one channel to another. More details of the operation of the FCC middleware component 220 are provided below.

Figure 2:
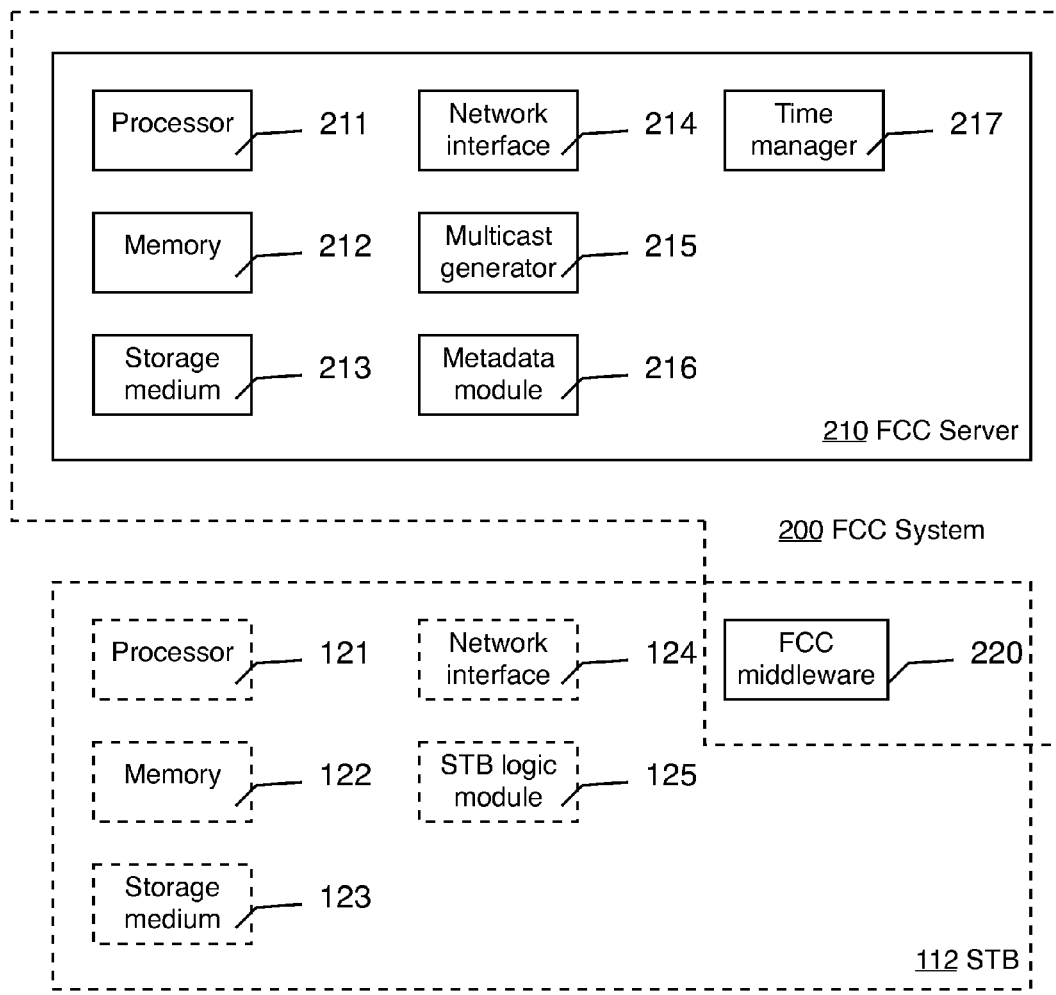
FIG. 2 is a schematic representation of an exemplary embodiment of a system for fast channel change.

FIG. 2 is a schematic representation of an exemplary embodiment of the system 200 for fast channel change. The system 200 comprises a FCC server 210 and one or more FCC middleware component 220. Only one FCC middleware component 220 is illustrated for clarity, and other components of an STB 112 are illustrated in chain-line for context. The FCC server 210 comprises a processor 211, processor-readable memory 212, optionally a processor-readable storage medium 213, a network interface 214, a multicast generator 215, a metadata module 216, and a time manager 217. The processor 211, processor-readable memory 212, processor-readable storage medium 213, and network interface 214 are of the well-known types typically used in video processing systems. The FCC server 210 receives and stores (i.e. captures) one or more multicast channels (i.e. video streams) from the video source 102. For each channel received, the multicast generator 215 generates a plurality of corresponding output streams. Each of the output streams contains the same video content as the received channel but each of the corresponding output streams is delayed in time relative to the received channel and each of the other output streams. The plurality of output streams corresponding to a received channel is referred to as a set of slotted multicasts. The first of the output streams is delayed, relative to the received channel, by a configurable delay time (T2) that is 3000 ms (i.e. 3 seconds) or greater. Each subsequent output stream is delayed, relative to the preceding output stream by spacing interval time (SI) that is 100 ms or less. The multicast generator 215 generates the set of slotted multicasts for a time interval (T1) that exceeds the longest time between adjacent Random Access Points (RAP) in the received channel by at least 200 ms. When the received channel contains encrypted video, T1 exceeds, by at least 200 ms, the longest time between adjacent RAP that are immediately preceded by a Program Association Table (PAT)/Program Map Tables (PMT)/Conditional Access Table (CAT) sequence or by a PAT/PMT with an Entitlement Control Message included in the PMT (i.e. a decodable RAP).

The router 106 receives, from the FCC server 210, the set of slotted multicasts corresponding to each of the received channels. The router 106 outputs to each DSLAM 110 one or more multicasts that have been joined by STB 112 connected to the DSLAM 110. The FCC server 210 and the router 106 are preferably co-located and directly connected in order to mitigate the need to use network 104 capacity to connect them.

The time manager 217 provides a local time reference to the FCC server 210 that is used for packet pacing in the generation of the sets of multicasts. The time manager 217 further synchronizes to an external time reference such as, for example, an Internet Engineer Task Force (IETF), Request for Comment (RFC)-1305, Network Time Protocol (NTP) compliant source 108. The current time with reference to the NTP source 108 is referred to as time N herein. The time manager 217 minimizes the effect of clock corrections, relative to the external time reference, on the output stream of the FCC server 210 by enhancing a NTP daemon (NTPD) function to update (i.e. synchronize) the current local time (CLT) on a configurable periodic basis (e.g. at 3:00 AM each day, or at 3:00 AM on Sunday of each week), and to compute a clock drift (CD) between the CLT, immediately prior to correction, and the NTP reference time (i.e. N). Where CD=N−CLT in ms units. The configuration of the times when the local clock is updated, and therefore outgoing packets boundaries are realigned, allows mitigation of the downstream effects (e.g. macroblocking) on receivers (i.e. STB 112) of the sets of multicasts.

Figure 3:
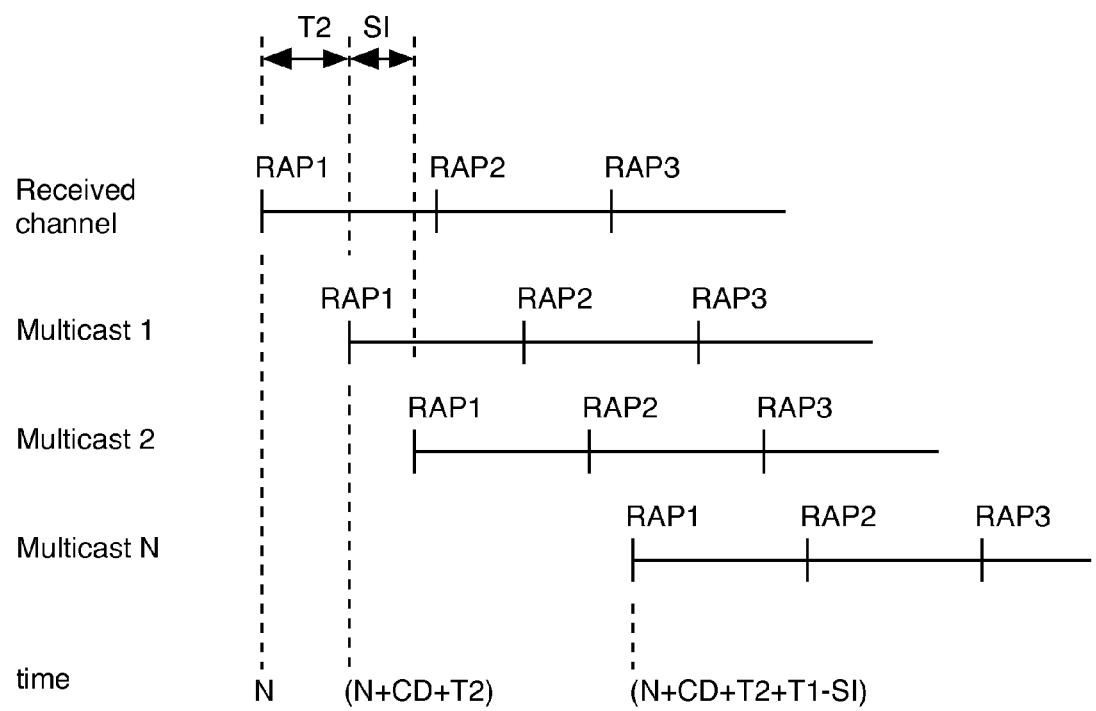
FIG. 3 is a schematic representation of the timing relationships between a received channel and an output set of corresponding multicasts.

FIG. 3 is a schematic representation of the timing relationships between a received channel and an output set of corresponding multicasts. For each received channel, the corresponding set of slotted multicasts are output continuously with a common reference point (e.g. a RAP) in the slotted multicasts occurring from a start time (N+CD+T2) to an end time (N+CD+T2+T1−SI).

FIG. 4 is a representation of an exemplary embodiment of an on-the-wire format for each FCC metadata record in a multicast metadata channel. The on-the-wire format can be published to facilitate the adoption of the on-the-wire format by multiple vendors for implementation in a middleware component includes in each STB 112. The metadata module 216 periodically (e.g. once per second) generates a FCC metadata record for each channel for which a set of slotted multicasts have been generated and inserts the FCC metadata record into a multicast metadata channel received from the video source 102 and output to the router 106. Each FCC metadata record contains:

a multicast address for the set of slotted multicasts;
  a multicast port range, represented by a lower and an upper port number;
  the space interval (SI) in milliseconds (ms);
  the delay value T2 ins milliseconds;
  the NTP time value for the start of a PAT/PMT/CAT/I-frame observed in the received channel specified with millisecond precision; and
  the current value of the FCC server 210 clock drift (CD).

The multicast metadata channel is output via the router 106 on a configurable multicast address and port combination and received by each of the STB 112. Each STB 112 retains each of the FCC metadata records received in the multicast metadata channel for a minimum time of T1+2000 ms. Given that the spacing between RAP will vary, the metadata records permit the arrival times of the RAP in the slotted multicasts to be derived by the FCC middleware component running on the STB 112.

Metadata records are provided by each FCC server 210 via a single multicast to all downstream middleware clients. The FCC metadata multicast transmissions are evenly spaced over the one second window so that each FCC server in the cluster can broadcast its own information without contention from its peers since a single well known multicast address and port are used. This allows an FCC cluster (i.e. a plurality of FCC servers) to provide redundant retransmissions while allowing for the unique clock drift per FCC server.

The FCC middleware component 220 executing on the STB 112 provides for fast switching to the user selected channel by using the FCC metadata records to select a slotted multicast that minimizes the total time to reach the next random access point (RAP) while allowing a maximum leave-join delay (LJD). The LJD is a constant value that is specified for a video distribution network that is, for example, of the order of 100 ms. Each slotted multicast has an associated port number starting with a port number (p_low) corresponding to the slotted multicast that has the least delay and successively numbered port numbers corresponding to slotted multicast having successively increasing delay. The selection is determined by determining a first port (FP) for which the equation CNTP+LJD<N+CD+(SI*(FP−p_low)) holds and where the port numbers are evaluated in increasing port number order.

Typically the total elapsed time required to begin priming a STB 112 jitter buffer should be less than LJD+SI. For example, if LJD=100 ms, CD=2 ms, and SI=50 ms, then the maximum time to begin filling the jitter buffer with a RAP preceded by a proper PAT/PMT sequence will be no more than 152 ms.

The channel change delay experienced by the user is the total time to fill the jitter buffer (typically less than 300 ms) plus the time for a codec in the STB 112 to receive a full frame and display it (typically 500 to 2000 ms).

Figure 5:
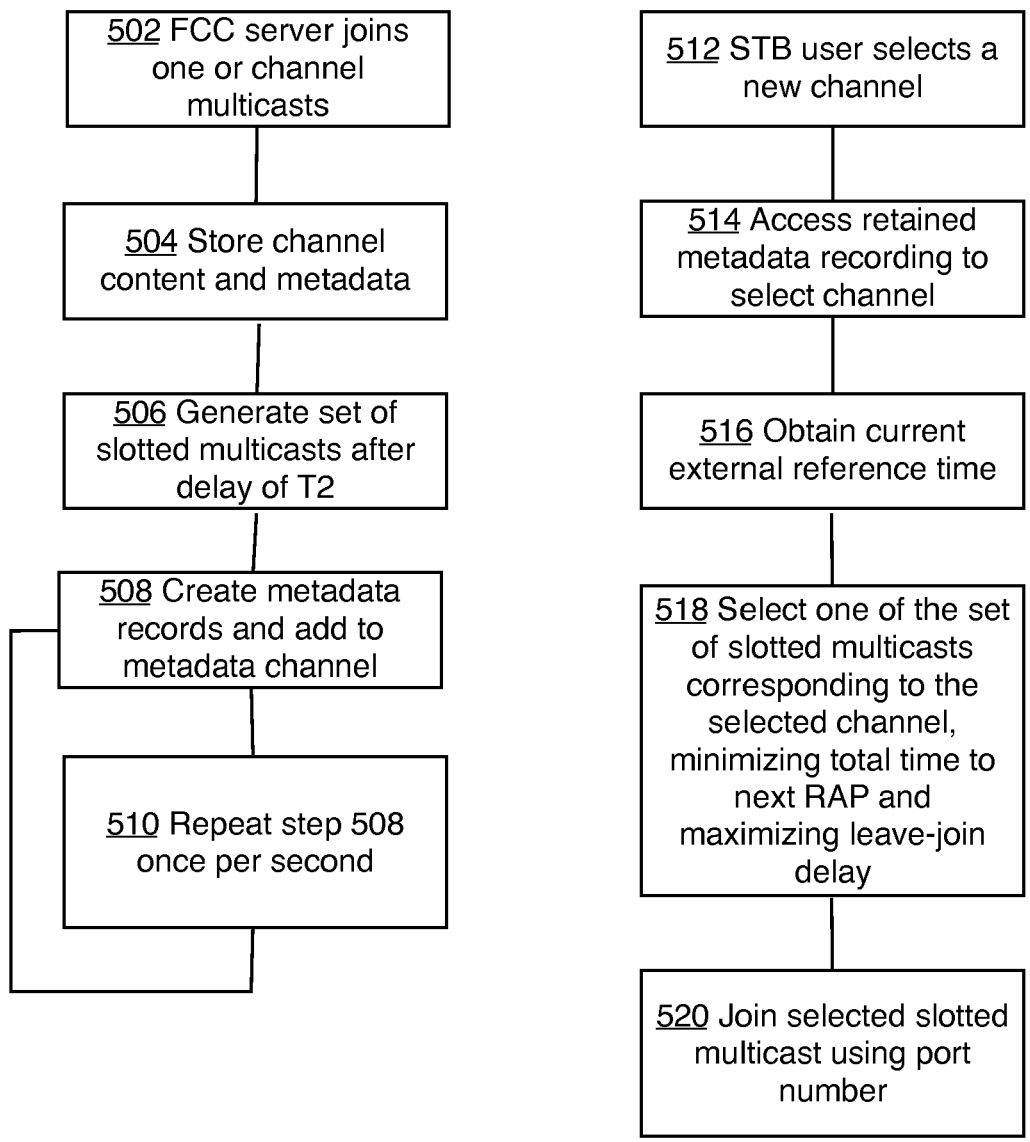
FIG. 5 is flow diagram representing exemplary steps in a method for fast channel change.

FIG. 5 is a flow diagram of exemplary steps in a method 500 for fast channel change. In step 502, the FCC server 210 joins one or more channel multicasts from the video source 102, each channel multicast corresponding to a different one of a plurality of video channels. In step 504, the received content and metadata associated with the joined channel are stored (i.e. retained). In step 506, a set of slotted multicasts, each having a same content as the stored channel content, is generated starting T2 after storing of the received content started. The individual slotted multicasts are spaced SI apart in time with a total number of slotted multicasts equal to (1+(T1/SI)). In step 508, a metadata record corresponding to each slotted multicast is created and added to the metadata channel. In step 510, step 508 is repeated once each second. Steps 502 through 510 can be performed by the FCC server 210 as described above with reference to FIGS. 1 and 2.

In step 512 a user of the STB 112 selects a new channel to be viewed. In step 514, the FCC middleware component 220 on the STB 112 accesses a retained metadata record corresponding to the selected channel. In step 516, the FCC middleware component 220 obtains the current external reference (e.g. NTP) time (CNTP). In step 518, the FCC middleware component 220 selects a one of the slotted multicasts corresponding to the selected channel that minimizes the total time to reach a next RAP while allowing a maximum leave-join delay (LJD). Each slotted multicast has an associated port number starting with a port number (p_low) corresponding to the slotted multicast that has the least delay and successively numbered port numbers corresponding to slotted multicast having successively increasing delay. The selection is determined by determining a first port (FP) for which the equation CNTP+LJD<N+CD+(SI*(FP−p_low)) holds and where the ports are evaluated in increasing port number order. In step 520, the middleware client provides the selected FP to the STB 112 and the corresponding slotted multicast is joined. The STB 112 joins the selected slotted multicast by sending a joint request to the DSLAM 110 including the multicast address and the port number corresponding to the selected slotted multicast. Steps 512 through 520 can be performed by the FCC middleware component 220 in conjunction with the STB 112 as described above with reference to FIGS. 1 and 2.

In an alternative embodiment, the FCC middleware component 220 can optionally apply a further constraint that requires that the time to the next RAP for the selected multicast (i.e. port) be greater than a minimum channel change delay. The minimum channel change delay can be a function of the type or model of STB 112 in which the FCC middleware component is included.

Figure 6:
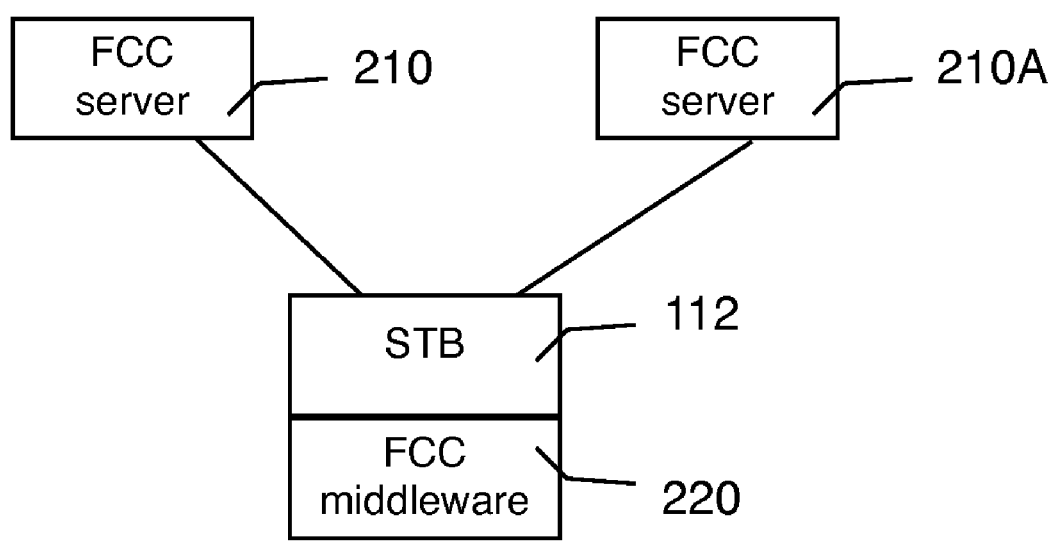
FIG. 6 is a schematic representation of exemplary embodiments of two FCC servers and a STB including a FCC middleware component.

FIG. 6 is a schematic representation of exemplary embodiments of two FCC servers 210, 210A and a STB 112 including a FCC middleware component 220. For simplicity the DSLAM 110 that would typically exists between the FCC servers 210, 210A and the STB 112 are not illustrated. The FCC server 210, the STB 112 and the FCC middleware 220 operate in substantially the same way as described above with reference to FIGS. 1 and 2. The FCC server 210A is an alternative embodiment in which the time manager 217 keeps the local time reference substantially continuously in synchronization with the external time reference and therefore the CD (i.e. N−CLT) is substantially zero at all times. The FCC middleware component 220 can receive multicasts from both FCC servers 210, 210A concurrently. The FCC middleware component 220 selects a slotted multicast that minimizes the total time to reach the next random access point (RAP) while allowing a maximum LJD separately for multicasts from each FCC server 210, 210A using the FCC metadata records provided respectively by each FCC server 210, 210A. The FCC middleware component 220 included in a STB 112 can receive and perform fast channel changes for multicast channels from a plurality of heterogeneous FCC servers 210 without the need for the FCC middleware component 220 to be aware of the number or types (i.e. particular characteristics) of the FCC servers 210.

The method according to the present invention can be implemented by processor executable program instructions stored on a processor-readable storage medium such as, fore example, those found in FCC server 210 and STB 112.

The method and system for fast channel change addresses the competing need of the FCC server 210 to use a local time reference (e.g. system clock) for packet (i.e. output) pacing with the need to use a common time reference in both the FCC server 210 and the FCC middleware component 220 in order to allow the FCC middleware component 220 to join the selected slotted multicast at a RAP. Clock drift between the FCC server 210 local time reference and the common time reference is accounted for and selection of a slotted multicast by the FCC middleware component 220 is adjusted accordingly.

The method and system for fast channel change responds to the preference of operators of video distribution systems for system architectures having easy to calculate fixed cost and that do not increase the dynamic/unpredictable run-time behavior. The present invention does not require additional peak capacity as there is no burst data, has a fixed cost per FCC server 210 regardless of the number of downstream STB 112, has a fixed cost for the FCC middleware component 220 regardless of the number channel changes or the type of channel selected, has fixed network overhead regardless of the number of channel changes in a given time interval and the aggregate bandwidth for transmitting the FCC metadata is fixed, It will be apparent to one skilled in the art that numerous modifications and departures from the specific embodiments described herein may be made without departing from the spirit and scope of the present invention.

The invention claimed is:

1. A system for fast channel change (FCC) comprising:
a FCC server for:
generating, responsive to a received and stored multicast channel, a plurality of corresponding slotted multicasts each having the same content as the multicast channel and delayed in time relative to the multicast channel and to each of the other slotted multicasts;
generating a FCC metadata record for each of the slotted multicasts; and
inserting the FCC metadata records into a multicast metadata channel output by the FCC server; and
one or more FCC middleware components, each for determining, responsive to a channel change request from a viewer, the slotted multicast that minimizes the total time to reach a next random access point while allowing a maximum leave-join delay based on metadata records received in the multicast metadata channel wherein:
a first of the plurality of slotted multicasts is delayed relative to the received multicast channel by a configurable delay time T2 that is 3000 mS or greater;
each subsequent slotted multicast is delayed relative to the preceding slotted multicast by a spacing interval time SI that is 100 mS or less; and
the FCC server generates slotted multicasts for a time interval T1 that exceeds the longest time between adjacent random access points (RAP), in the multicast channel, by at least 200 mS.

2. The system of claim 1, the FCC server further for:
using a local time reference for pacing packets in generating the plurality of slotted multicasts and for determining a current local time CLT;
synchronizing to an external time reference for determining a current reference time N; and
computing a clock drift CD=N−CLT.

3. The system of claim 2, wherein the FCC server minimizes the effect of clock correction by generating the plurality of slotted multicasts from a start time equal to N+CD+T2 to an end time equal to N+CD+T2+T1−SI.

4. The system of claim 2, wherein each FCC metadata record is generated on a periodic basis and contains:
a multicast address for the plurality of slotted multicasts;
a multicast port range, represented by a lower and an upper port number;
the spacing interval time SI;
a start time for each RAP occurring in the received multicast channel during the metadata record generation period, represented relative to the external time reference; and
a current value of the clock drift CD.

5. The system of claim 4, wherein the content of the metadata records is published as an on-the-wire format that can be adopted by multiple vendors in implementing multiple FCC middleware components that are compatible with the FCC server.

6. The system of claim 4, wherein each slotted multicast has an associated port number starting with a lowest port number p_low corresponding to the slotted multicast having the least delay and successive port numbers corresponding to slotted multicast having successively increasing delay; and
each FCC middleware component further for:
synchronizing to the external time reference to obtain a current external time CNTP; and
determining the slotted multicast that minimizes the total time to reach a next random access point while allowing a maximum leave join delay LJD by selecting a first port FP for which the equation CNTP+LJD.

7. The system of claim 1, wherein the multicast channel contains encrypted video and the time interval T1 exceeds the longest time between adjacent decodable RAP, in the multicast channel, by at least 200 mS.

8. The system of claim 1, the FCC server further for:
using an external time reference for pacing packets in generating the plurality of slotted multicasts and for determining a current local time CLT that is equal to a current reference time N; and
setting a clock drift CD to zero.

9. The system of claim 1, each FCC middleware component further determining the slotted multicast that minimizes the total time to reach a next random access point while allowing a maximum leave-join delay, and for which the time to the next random access point is greater than a minimum channel change delay.

10. A method for fast channel change (FCC) comprising,:
generating, responsive to a received and stored multicast channel, a plurality of corresponding slotted multicasts each having the same content as the multicast channel and delayed in time relative to the multicast channel and to each of the other slotted multicasts;
generating a FCC metadata record for each of the slotted multicasts; and
inserting the FCC metadata records into a multicast metadata channel output by the FCC server; and
determining, responsive to a channel change request from a viewer, the slotted multicast that minimizes the total time to reach a next random access point while allowing a maximum leave-join delay based on metadata records received in the multicast metadata channel;
wherein:
a first of the plurality of slotted multicasts is delayed relative to the received multicast channel by a configurable delay time T2 that is 3000 mS or greater;
each subsequent slotted multicast is delayed relative to the preceding slotted multicast by a spacing interval time SI that is 100 mS or less; and
slotted multicasts for a time interval T1 that exceeds the longest time between adjacent random access points (RAP), in the multicast channel, by at least 200 mS.

11. The method of claim 10, further comprising:
using a local time reference for pacing packets in generating the plurality of slotted multicasts and for determining a current local time CLT;
synchronizing to an external time reference for determining a current reference time N; and
computing a clock drift CD=N−CLT.

12. The method of claim 11, wherein the effect of clock correction is minimized by generating the plurality of slotted multicasts from a start time equal to N+CD+T2 to an end time equal to N+CD+T2+T1−SI.

13. The method of claim 11, wherein each FCC metadata record is generated on a periodic basis and contains:
a multicast address for the plurality of slotted multicasts;
a multicast port range, represented by a lower and an upper port number;
the spacing interval time SI;
a start time for each RAP occurring in the received multicast channel during the metadata record generation period, represented relative to the external time reference; and
a current value of the clock drift CD.

14. The method of claim 13, wherein the content of the metadata records is published as an on-the-wire format that can be adopted by multiple vendors in implementing the method.

15. The method of claim 13, wherein each slotted multicast has an associated port number starting with a lowest port number p_low corresponding to the slotted multicast having the least delay and successive port numbers corresponding to slotted multicast having successively increasing delay; and the method further comprising:

synchronizing to the external time reference to obtain a current external time CNTP; and determining the slotted multicast that minimizes the total time to reach a next random access point while allowing a maximum leave join delay LJD by selecting a first port FP for which the equation CNTP+LJD.

16. The method of claim 10, wherein the multicast channel contains encrypted video and the time interval T1 exceeds the longest time between adjacent decodable RAP, in the multicast channel, by at least 200 mS.

17. The method of claim 10 further comprising:

using an external time reference for pacing packets in generating the plurality of slotted multicasts and for determining a current local time CLT that is equal to a current reference time N; and setting a clock drift CD to zero.

18. The method of claim 10, further comprising determining the slotted multicast that minimizes the total time to reach a next random access point while allowing a maximum leave-join delay, and for which the time to the next random access point is greater than a minimum channel change delay.

* * * * *